(12) United States Patent
Chiu

(10) Patent No.: US 7,176,492 B2
(45) Date of Patent: Feb. 13, 2007

(54) METHOD FOR FORMING CERAMIC MICROSTRUCTURES ON A SUBSTRATE USING A MOLD AND ARTICLES FORMED BY THE METHOD

(75) Inventor: Raymond Chi-Hing Chiu, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 95 days.

(21) Appl. No.: 09/974,223

(22) Filed: Oct. 9, 2001

(65) Prior Publication Data

US 2003/0100192 A1    May 29, 2003

(51) Int. Cl.
*H01L 29/04* (2006.01)

(52) U.S. Cl. .......................................... 257/72; 445/24
(58) Field of Classification Search ................ 257/57, 257/59, 66, 72, 79, 99, 91, 103, E21.257, 257/27, 49; 313/257, 315, 581, 582, 584, 313/493, 586; 445/24
See application file for complete search history.

(56) References Cited

U.S. PATENT DOCUMENTS

| | | | |
|---|---|---|---|
| 3,689,346 A | 9/1972 | Rowland | 156/245 |
| 3,811,814 A | 5/1974 | Earle et al. | 425/385 |
| 3,816,043 A | 6/1974 | Snelling et al. | 425/4 |
| 4,026,714 A | 5/1977 | Lewis | 106/47 |
| 4,340,276 A | 7/1982 | Maffitt et al. | 350/164 |
| 4,536,435 A | 8/1985 | Utsumi et al. | 428/209 |
| 4,554,259 A | 11/1985 | Franklin et al. | 501/67 |
| 4,617,279 A | 10/1986 | Manabe et al. | 501/10 |
| 4,640,900 A | 2/1987 | Kokubu et al. | 501/67 |
| 4,734,143 A | 3/1988 | Meoni | 156/102 |
| 4,756,856 A | 7/1988 | Choinski | 264/22 |
| 4,857,420 A | 8/1989 | Maricle et al. | 429/30 |
| 4,867,935 A | 9/1989 | Morrison, Jr. | 264/61 |
| 4,975,104 A | 12/1990 | Kim | 65/18.1 |
| 5,004,950 A | 4/1991 | Lee | 313/582 |
| 5,011,391 A | 4/1991 | Kawasaki et al. | 445/24 |
| 5,037,723 A | 8/1991 | Hwang | 430/320 |
| 5,096,401 A | 3/1992 | Tamura et al. | 425/115 |
| 5,116,704 A | 5/1992 | Kwon | 430/3 |
| 5,136,207 A | 8/1992 | Miyake et al. | 313/582 |
| 5,175,030 A | 12/1992 | Lu et al. | 428/30 |
| 5,183,597 A | 2/1993 | Lu | 264/1.4 |

(Continued)

FOREIGN PATENT DOCUMENTS

EP    0 802 170    10/1997

(Continued)

OTHER PUBLICATIONS

U.S. Appl. No. 09/221,007.

(Continued)

*Primary Examiner*—Brook Kebede
(74) *Attorney, Agent, or Firm*—Carolyn A. Fischer

(57) ABSTRACT

A microstructured assembly including a barrier portions and land portions is described. The microstructures have alternating barrier portions and land portions that have barrier surfaces and land surfaces, respectively. Each barrier surface and land surface is connected by curved surface, which is part of a curved portion. The curved surface and the land surface are substantially continuous.

9 Claims, 14 Drawing Sheets

U.S. PATENT DOCUMENTS

| | | | |
|---|---|---|---|
| 5,205,770 A | 4/1993 | Lowrey et al. | 445/24 |
| 5,209,688 A | 5/1993 | Nishigaki et al. | 445/24 |
| 5,247,227 A | 9/1993 | Park | 313/584 |
| 5,268,233 A | 12/1993 | Heller et al. | 428/523 |
| 5,342,563 A | 8/1994 | Quinn et al. | 264/63 |
| 5,352,478 A | 10/1994 | Miyake et al. | 427/68 |
| 5,484,314 A | 1/1996 | Farnworth | 445/24 |
| 5,509,840 A | 4/1996 | Huang et al. | 445/24 |
| 5,527,624 A | 6/1996 | Higgins et al. | 428/523 |
| 5,545,670 A | 8/1996 | Bissbort et al. | 514/562 |
| 5,581,876 A | 12/1996 | Prabhu et al. | 29/851 |
| 5,585,428 A | 12/1996 | Quinn et al. | 524/400 |
| 5,601,468 A | 2/1997 | Fujii et al. | 445/24 |
| 5,629,583 A | 5/1997 | Jones et al. | 313/495 |
| 5,658,832 A | 8/1997 | Bernhardt et al. | 264/272.1 |
| 5,667,418 A | 9/1997 | Fahlen et al. | 445/25 |
| 5,672,460 A | 9/1997 | Katoh et al. | 430/198 |
| 5,703,433 A | 12/1997 | Fujii et al. | 313/484 |
| 5,707,267 A | 1/1998 | Hayashi | 445/24 |
| 5,714,840 A | 2/1998 | Tanabe et al. | 313/581 |
| 5,725,407 A | 3/1998 | Liu et al. | 445/52 |
| 5,747,931 A | 5/1998 | Riddle et al. | 313/581 |
| 5,776,545 A | 7/1998 | Yoshiba et al. | 427/356 |
| 5,840,465 A | 11/1998 | Kakinuma et al. | 430/270.1 |
| 5,853,446 A | 12/1998 | Carre et al. | 65/17.3 |
| 5,854,152 A | 12/1998 | Kohli et al. | 501/70 |
| 5,854,153 A | 12/1998 | Kohli | 501/70 |
| 5,909,083 A | 6/1999 | Asano et al. | |
| 6,008,582 A | 12/1999 | Asano et al. | 313/582 |
| 6,023,130 A | 2/2000 | Sakasegawa et al. | 313/582 |
| 6,043,604 A * | 3/2000 | Horiuchi et al. | 313/582 |
| 6,140,759 A * | 10/2000 | Sreeram et al. | 313/493 |
| 6,149,482 A | 11/2000 | Sakasegawa et al. | |
| 6,156,433 A * | 12/2000 | Hatori et al. | 428/411.1 |
| 6,184,621 B1 | 2/2001 | Horiuchi et al. | 313/586 |
| 6,199,404 B1 * | 3/2001 | Kawai et al. | 65/102 |
| 6,220,915 B1 | 4/2001 | Radloff | 445/60 |
| 6,247,986 B1 | 6/2001 | Chiu et al. | 445/24 |
| 6,306,948 B1 | 10/2001 | Yokoyama et al. | 524/492 |
| 6,325,610 B2 | 12/2001 | Chiu et al. | 425/150 |
| 2001/0007682 A1 | 7/2001 | Chiu et al. | |

FOREIGN PATENT DOCUMENTS

| | | |
|---|---|---|
| EP | 0 836 892 | 4/1998 |
| EP | 0 855 731 | 7/1998 |
| EP | 0 866 487 | 9/1998 |
| EP | 0 893 813 A2 | 1/1999 |
| FR | 2 764 438 | 11/1998 |
| GB | 1257621 | 12/1971 |
| JP | 1-137534 | 5/1989 |
| JP | 3-54569 | 3/1991 |
| JP | 8-273537 | 10/1996 |
| JP | 8-321258 | 12/1996 |
| JP | 9-12336 | 1/1997 |
| JP | 09012336 | 1/1997 |
| JP | 9-134676 | 5/1997 |
| JP | 10-134705 | 5/1997 |
| JP | 9-147754 | 6/1997 |
| JP | 9-283017 | 10/1997 |
| JP | 10241579 A * | 9/1998 |
| JP | 10-326571 | 12/1998 |
| JP | 11-135025 | 5/1999 |
| JP | 11-339668 | 12/1999 |
| JP | 2000-21303 | 1/2000 |
| JP | 2003-40106 | 12/2000 |
| WO | 97/22961 | 6/1997 |
| WO | 99/60446 | 11/1999 |
| WO | WO 00/39831 | 6/2000 |
| WO | 00/39829 | 7/2000 |
| WO | 00/58990 | 10/2000 |
| WO | 01/20636 | 3/2001 |
| WO | WO 01/20636 | 3/2001 |
| WO | WO 01/30723 | 5/2001 |
| WO | 01/52299 | 7/2001 |
| WO | 01/95361 | 12/2001 |

OTHER PUBLICATIONS

U.S. Appl. No. 09/975,385.

* cited by examiner

METHOD FOR FORMING CERAMIC MICROSTRUCTURES ON A SUBSTRATE USING A MOLD AND ARTICLES FORMED BY THE METHOD

TECHNICAL FIELD

The present invention generally relates to methods of forming structures on patterned substrates. More specifically, the present invention relates to improved methods of molding ceramic structures that retain a desired shape after thermal processing. The present invention also relates to molding ceramic structures on patterned substrates for display applications, and to displays having molded barrier ribs.

BACKGROUND

Advancements in display technology, including the development of plasma display panels (PDPs) and plasma addressed liquid crystal (PALC) displays, have led to an interest in forming electrically-insulating ceramic barrier ribs on glass substrates. The ceramic barrier ribs separate cells in which an inert gas can be excited by an electric field applied between opposing electrodes. The gas discharge emits ultraviolet (uv) radiation within the cell. In the case of PDPs, the interior of the cell is coated with a phosphor which gives off red, green, or blue visible light when excited by uv radiation. The size of the cells determines the size of the picture elements (pixels) in the display. PDPs and PALC displays can be used, for example, as the displays for high definition televisions (HDTV) or other digital electronic display devices.

One way in which ceramic barrier ribs can be formed on glass substrates involves laminating a planar rigid mold onto a substrate with a glass- or ceramic-forming composition disposed in the mold. The glass- or ceramic-forming composition is then solidified and the mold is removed. Finally, the barrier ribs are fused or sintered by firing at a temperature of about 550° C. to about 1600° C. The glass- or ceramic-forming composition has micrometer-sized particles of glass frit dispersed in an organic binder. The use of an organic binder allows barrier ribs to be solidified in a green state so that firing fuses the glass particles in position on the substrate. However, in applications such as PDP substrates, highly precise and uniform barrier ribs with few or no defects or fractures are desirable. This can pose challenges, especially during removal of the mold from the green state barriers and during firing of the green state barrier ribs.

Mold removal can damage barriers due to difficulty in mold release. Because barrier ribs tend to shrink during firing, the green state barrier ribs are generally taller than the size desired for the fused barriers. Taller structures can make demolding even more difficult. Mold removal can also damage the mold. When material cannot be completely removed from the mold, the mold is typically discarded. In addition, at temperatures required for firing, the barrier ribs can fracture, delaminate from the substrate, or warp. The substrate also goes through dimensional changes during firing due to thermal expansion and release of internal stresses.

Microstructures, such as the barrier ribs, can also be used in other applications.

SUMMARY OF THE INVENTION

In general, the invention is directed to articles and devices having microstructures disposed on a substrate and methods of making these articles and devices. PDP's and other display devices are examples of such articles and devices. One embodiment is a microstructured assembly. The microstructures have alternating barrier portions and land portions with barrier surfaces and land surfaces, respectively. Each barrier surface and land surface is connected by curved surface, which is part of a curved portion. The curved surface and the land surface are substantially continuous.

Another embodiment of the invention is a microstructured assembly. The assembly includes ceramic microstructures molded and hardened on a glass substrate having a pattern of addressable electrodes. The microstructures have alternating barrier portions and land portions with barrier surfaces and land surfaces, respectively. Each barrier surface and land surface is connected by curved surface which is part of a curved portion. The curved surface and the land surface are substantially continuous. The land portions of the microstructure are also aligned with the pattern of electrodes of the glass substrate.

Another embodiment of the invention is a microstructured assembly. The assembly includes microstructures molded and hardened on a substrate. The microstructures include alternating barrier portions and land portions. The width of the barrier portion at its top is not more than 75 μm.

Another embodiment of the invention is a microstructured assembly. The assembly includes microstructures molded and hardened on a substrate. The microstructures have alternating barrier portions and land portions that have barrier surfaces and land surfaces, respectively. The barrier portions also have ends that are step-shaped.

Another embodiment of the invention is a process for making a microstructured assembly. A curable material is disposed on a patterned substrate. A mold shapes the material into microstructures having alternating barrier portions and land portions that have barrier surfaces and land surfaces, respectively. Each barrier surface and land surface is connected by curved surface, which is part of a curved portion. The curved surface and the land surface are substantially continuous. The mold is removed. Optionally the material is cured or treated to harden the microstructures. Optionally the mold is stretched to align the microstructures with the patterned substrate.

Another embodiment of the invention is a method of making a microstructured assembly. A slurry including ceramic powder and a curable fugitive binder is disposed on a glass substrate patterned with electrodes. The slurry is shaped with a mold into microstructures having alternating barrier portions and land portions that have barrier surfaces and land surfaces, respectively. Each barrier surface and land surface is connected by curved surface, which is part of a curved portion. The curved surface and the land surface are substantially continuous. The binder is cured to harden the slurry and adhere the slurry to the substrate. The mold is removed to leave green state microstructures on the substrate that replicate the pattern of the mold. The green state microstructures are debinded and fired to burn out the binder and sinter the ceramic powder to form ceramic microstructures.

Another embodiment is a process to shape barrier ends of microstructures. A weight is applied to the barrier ends of green state microstructures. A portion of the bottom of the weight contacts the top corner of the barrier ends. The microstructures are fired and the weight is removed.

BRIEF DESCRIPTION OF THE DRAWINGS

The invention may be more completely understood in consideration of the following detailed description of various embodiments of the invention in connection with the accompanying drawings in which.

Figure 1:
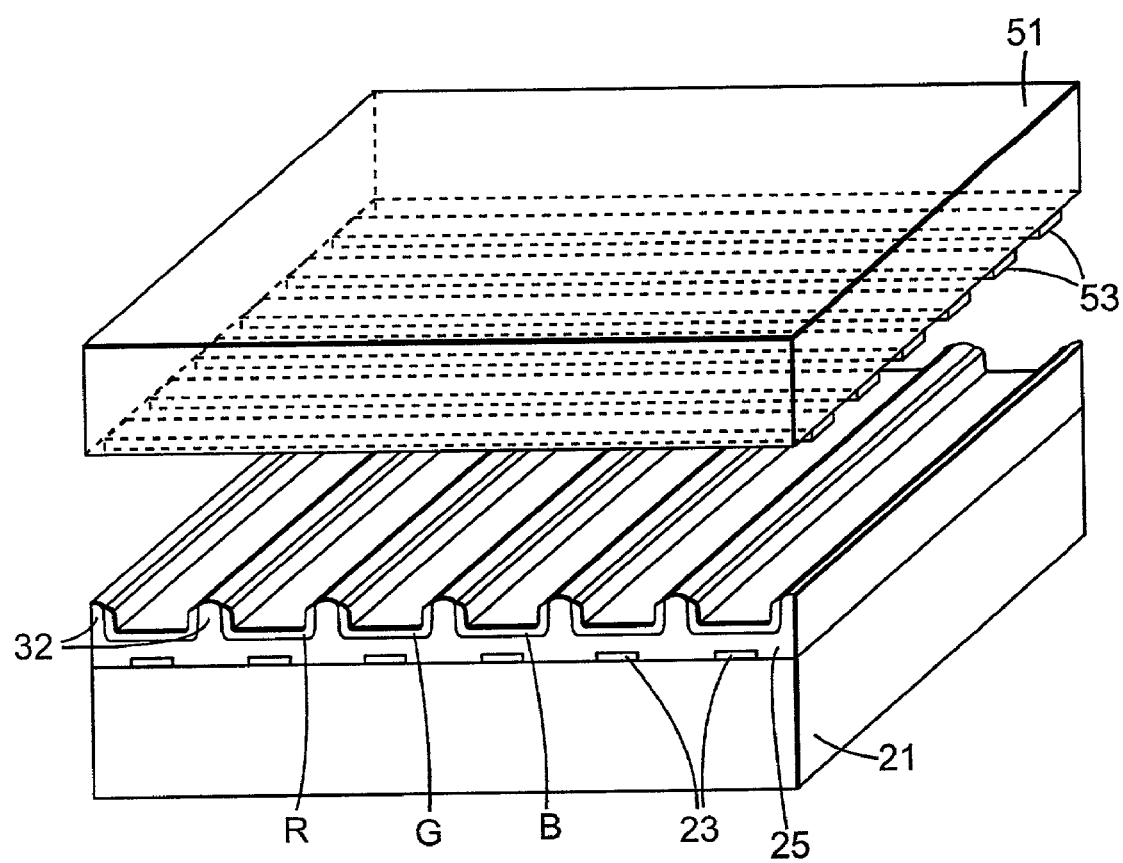
FIG. 1 is a three dimensional schematic representation of a plasma display panel assembly.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Methods have previously been described that enable accurate molding and formation of microstructures on a patterned substrate. For example, PCT Patent Publication No. WO/0038829 and U.S. patent application Ser. No. 09/219,803, incorporated herein by reference, describe the molding and aligning of ceramic barrier microstructures on an electrode-patterned substrate. PCT Patent Publication No. WO/0038829 and U.S. patent application Ser. No. 09/219,803, describe methods of forming ceramic barrier microstructures that are particularly useful in electronic displays, such as PDPs and PALC displays, in which pixels are addressed or illuminated via plasma generation between opposing substrates. U.S. patent application entitled, "METHOD FOR FORMING MICROSTRUCTURES ON A SUBSTRATE USING A MOLD", Ser. No. 09/975,385, filed on even date herewith, incorporated herein by reference, describes methods for making ceramic microstructures on a substrate using a mold.

Such plasma displays have various substrate elements, as illustrated in FIG. 1. The back substrate element, oriented away from the viewer, has a back substrate 21 with independently addressable parallel electrodes 23. The back substrate 21 can be formed from a variety of compositions, for example, glass, ceramic, metal, or plastic. Ceramic microstructures 25 include barrier portions 32 that are positioned between back electrodes 23 and separate areas in which red (R), green (G), and blue (B) phosphors are deposited. The front substrate element includes a glass substrate 51 and a set of independently addressable parallel electrodes 53. The front electrodes 53, also called sustain electrodes, are oriented perpendicular to the back electrodes 23, also referred to as address electrodes. In a completed display, the area between the front and back substrate elements is filled with an inert gas. To light up a pixel, an electric field is applied between crossed sustain 53 and address electrodes 23 with enough strength to excite the inert gas atoms therebetween. The excited inert gas atoms emit uv (ultraviolet) radiation which causes the phosphor to emit red, green, or blue visible light.

Back substrate 21 is preferably a transparent glass substrate. Typically, back substrate 21 is made of soda lime glass which can optionally be substantially free of alkali metals. The temperatures reached during processing can cause migration of the electrode material in the presence of alkali metal in the substrate. This migration can result in conductive pathways between electrodes, thereby shorting out adjacent electrodes or causing undesirable electrical interference between electrodes known as "crosstalk." The back substrate 21 should be able to withstand the temperatures required for sintering, or firing, the ceramic barrier material. Firing temperatures may vary widely from about 400° C. to 1600° C., but typical firing temperatures for PDPs manufactured onto soda lime glass substrates range from about 400° C. to about 600° C., depending on the softening temperature of the ceramic powder in the slurry. Front substrate 51 is a transparent glass substrate which preferably has the same or about the same coefficient of thermal expansion as that of the back substrate 21.

Electrodes are strips of conductive material. Typically, the electrodes are copper, aluminum, or a silver-containing conductive frit. The electrodes can also be made of a transparent conductive oxide material, such as indium tin oxide, especially in cases where it is desirable to have a transparent display panel. The electrodes are patterned on or in back substrate 21. For example, the electrodes can be formed as parallel strips spaced about 120 µm to 360 µm apart, having widths of about 50 µm to 75 µm, thicknesses of about 2 µm to 15 µm, and lengths that span the entire active display area which can range from a few centimeters to several tens of centimeters. In some instances the widths of the back electrodes 23 can be, for example, narrower than 50 µm or wider than 75 µm, depending on the architecture of the microstructures 25. For example, in high definition plasma display panels, it is preferable that the electrodes are less than 50 µm in width.

Material for forming microstructures 25 typically includes ceramic particles that can be fused or sintered by firing to form rigid, substantially dense, dielectric structures. The ceramic material of the microstructures 25 is preferably alkali-metal free and can include glass and other noncrystalline oxides. The presence of alkali metals in the glass frit or ceramic powder can lead to undesirable migration of conductive material from the electrodes on the substrate. The ceramic material forming the barriers has a softening temperature lower than the softening temperature of the substrate. The softening temperature is the lowest temperature at which a glass or ceramic material can be fused to a relatively dense structure having little or no surface-connect porosity. Preferably, the softening temperature of the ceramic material of the slurry is no more than about 600° C., more preferably no more than about 560° C., and most preferably no more than about 500° C. Preferably, the material of the microstructures 25 has a coefficient of thermal expansion that is within 10% of the coefficient of expansion of the glass substrates. Close matching of the coefficients of expansion of the microstructures 25 and the back substrate 21 reduces the chances of damaging the microstructures 25 during processing. Also, differences in coefficients of thermal expansion can cause significant substrate warpage or breakage.

The barrier portions 32 in PDPs can have heights, for example, of about 100 μm to about 170 μm and widths of about 20 μm to about 80 μm. The pitch (number of barriers per transverse cross-sectional unit length) of the barriers preferably matches the pitch of the electrodes.

Figure 2:
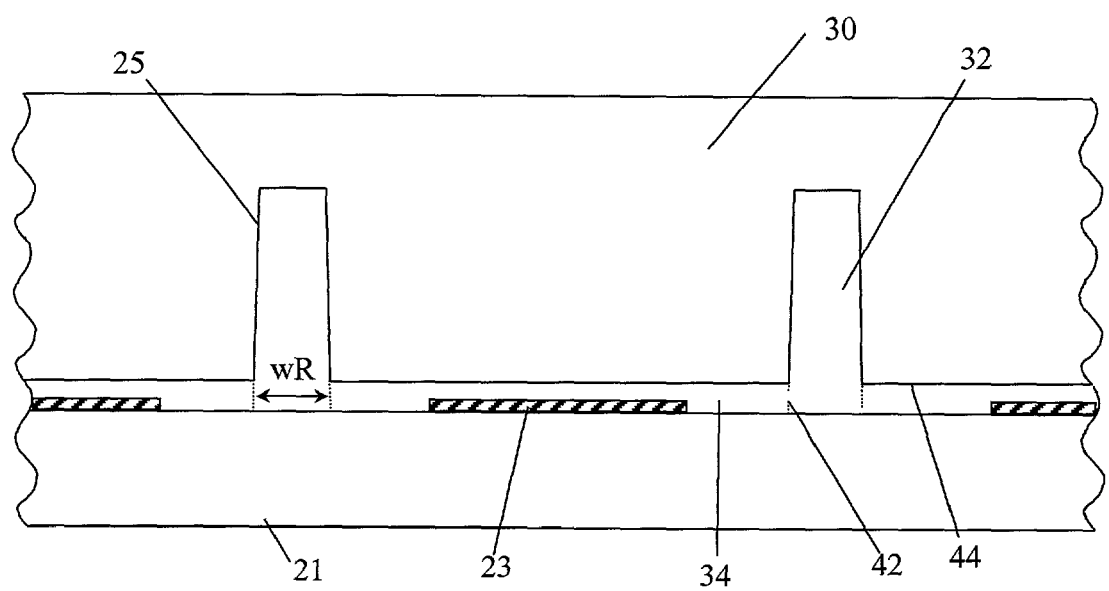
FIG. 2 is a transverse cross-sectional schematic representation of microstructures molded and aligned on a patterned substrate.

PCT Patent Publication No. WO/0038829, U.S. patent application Ser. No. 09/219,803, and U.S. patent application entitled, "METHOD FOR FORMING MICROSTRUCTURES ON A SUBSTRATE USING A MOLD", Ser. No. 09/975,385, filed on even date herewith, all herein incorporated by reference, describe methods for forming and aligning microstructures on a patterned substrate. One method proceeds by placing a mixture comprising a curable material between a patterned substrate and a patterned surface of a mold. FIG. 2 illustrates a transverse cross-section of the mold 30, curable material which forms the microstructures 25, and a back substrate 21 with back electrodes 23. The patterned surface of the mold 30 is able to form a plurality of microstructures 25 from the curable material that is between the mold 30 and the back substrate 21. The mold 30 can optionally be stretched to align a predetermined portion of the patterned surface of the mold 30 with a correspondingly predetermined portion of the patterned back substrate 21, as defined by the spacing of the back electrodes 23.

The material for forming the microstructures 25 on the patterned back substrate 21 can be placed between the mold 30 and the back substrate 21 in a variety of ways. The material can be placed directly in the pattern of the mold 30 followed by placing the mold 30 and material on the back substrate 21; the material can be placed on the back substrate 21 followed by pressing the mold 30 against the material on the back substrate 21; the material can be placed on the back substrate 21 and then contacted with the mold 30; or the material can be introduced into a gap between the mold 30 and the back substrate 21 as the mold 30 and back substrate 21 are brought together by mechanical or other means. The method used for placing the material between the mold 30 and the back substrate 21 depends on, among other things, the aspect ratio of the microstructures 25 to be formed on the back substrate 21, the viscosity of the microstructure-forming material, and the rigidity of the mold 30. Generally, microstructures 25 having heights that are large compared to their widths (high aspect ratio structures) utilize molds 30 having relatively deep indentations. In these cases, depending on the viscosity of the material, it can be difficult to completely fill the indentations of the mold 30 unless the material is injected into the indentations of the mold 30 with some force. Preferably, the indentations of the mold 30 are completely filled while minimizing the introduction of bubbles or air pockets in the material.

While placing the curable material between the mold 30 and the back substrate 21, pressure can be applied between the back substrate 21 and the mold 30 to set a thickness of the land portion 34, as in FIG. 2. The land portion 34 is generally the portion of the microstructure 25 between the barrier portions 32, and which partially surrounds or is positioned above the back electrodes 23. If a zero thickness of the land portion 34 is desired, it may be preferable to fill the mold 30 with the material and then remove any excess material from the mold 30 using a blade or squeegee before contacting the back substrate 21. For other applications, it may be desirable to have a non-zero thickness of the land portion 34. In the case of PDPs, the material forming the microstructures 25 is generally a dielectric, and the thickness of the land portion 34 determines the thickness of dielectric material positioned on back electrodes 23. Thus, for PDPs, the thickness of the land portion 34 can be important for determining what voltage is applied between the back electrodes 23 and sustain electrodes 53 to generate a plasma and to activate a picture element.

After alignment of the pattern of the mold 30 with the pattern of the substrate, the material between the mold 30 and the back substrate 21 is cured to form green state microstructures 45 adhered to the surface of the back substrate 21. Prior to debinding, microstructures can be referred to as green state microstructures. Curing of the material can take place in a variety of ways depending on the binder resin used. For example, the material can be cured using visible light, ultraviolet light, e-beam radiation, other forms of radiation, heat curing, or cooling to solidification from a melted state. When curing by radiation, radiation can be propagated through the back substrate 21, through the mold 30, or through the back substrate 21 and the mold 30. Preferably, the cure system chosen facilitates adhesion of the cured material to the back substrate 21. As such, in cases where material is used which tends to shrink during hardening and radiation curing, the material is preferably cured by irradiating through the back substrate 21. If the material is cured only through the mold 30, the material might pull away from the back substrate 21 via shrinkage during curing, thereby adversely affecting adhesion to the back substrate 21. In the present application, curable refers to a material that can be cured as described above.

Figure 3:
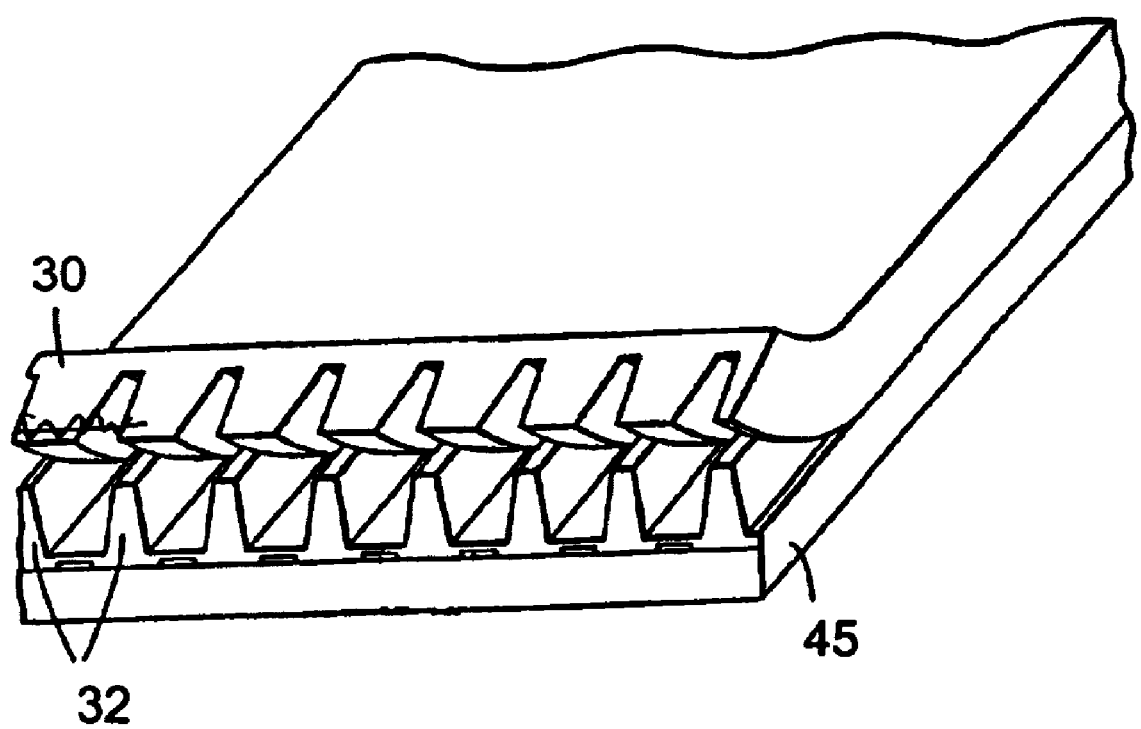
FIG. 3 is a schematic representation of a method of removing a mold from green state microstructures.

After curing the material to form green state microstructures 45 adhered to the back substrate 21 surface and aligned to the pattern of the back substrate 21, the mold 30 can be removed. Providing a stretchable and flexible mold 30 can aid in mold 30 removal because the mold 30 can be peeled back so that the demolding force can be focused on a smaller surface area. As shown in FIG. 3, when green state microstructures 45 having barrier portions 32 are molded, the mold 30 is preferably removed by peeling back along a direction parallel with barrier portions 32 and the pattern of the mold 30. This reduces the pressure applied perpendicular to the barrier portions 32 during mold removal, thereby reducing the possibility of damaging the barrier portions 32. Preferably, a mold release is included either as a coating on the patterned surface of the mold 30 or in the material that is used to form the microstructure 25 itself. A mold release material can become more important as higher aspect ratio structures are formed. Higher aspect ratio structures make demolding more difficult, and can lead to damage to the microstructures 25. As discussed above, curing the material from the back substrate 21 side not only helps improve adhesion of the hardened green state microstructures 45 to the back substrate 21, but can allow the green state microstructures 45 to shrink toward the back substrate 21 during curing, thereby pulling away from the mold 30 to permit easier demolding.

Figure 4:
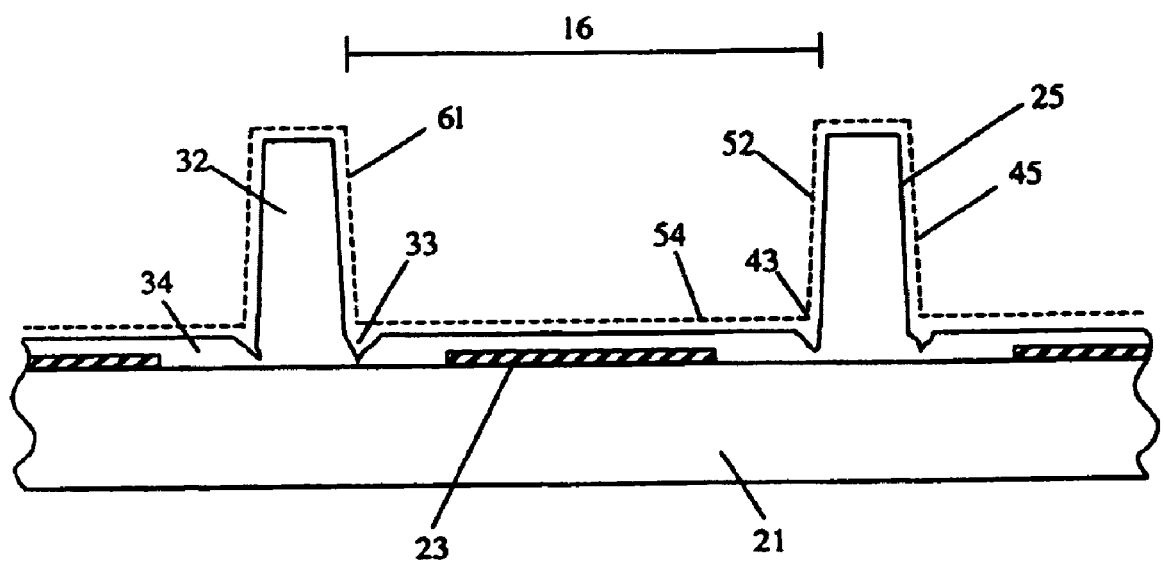
FIG. 4 is a transverse cross-sectional schematic representation of microstructures on a patterned substrate showing a pattern of shrinkage from the green state.

After the mold 30 is removed, what remains is the patterned back substrate 21 having a plurality of hardened green state microstructures 45 adhered thereon and aligned with the pattern of the back substrate 21. Depending on the application, this can be the finished product. In other applications the hardened material contains a binder that is preferably removed by debinding at elevated temperature. After debinding, or burning out of the binder, firing of the green state microstructures is performed to fuse the glass particles or sinter the ceramic particles in the microstructure material. This increases the strength and rigidity of the microstructures 25. Shrinkage can also occur during firing as the microstructures 25 densify. FIG. 4 illustrates ceramic microstructures 25 after firing on a back substrate 21 having patterned back electrodes 23. Firing densifies microstructures 25 so that their profile shrinks somewhat from the profile of the green state microstructure 45 as indicated. As shown, fired microstructures 25 maintain their positions and their pitch according to the back substrate 21 pattern.

For PDP display applications, phosphor material is applied to the channels 16 of the microstructures 25. The back substrate 21 with fired microstructures 25 then can be installed into a display assembly. This can involve aligning a front substrate 51 having sustain electrodes 53 with the back substrate 21 having back electrodes 23, microstructures 25, and phosphor such that the sustain electrodes 53 are perpendicular with the back electrodes 23, as shown in FIG. 1. The areas through which the opposing electrodes cross define the pixels of the display. The space between the substrates is then evacuated and filled with an inert gas as the substrates are bonded together and sealed at their edges.

The thickness profile of the land portion 34 of the microstructure 25, including dielectric thickness, can be an important aspect of a plasma display panel. The thickness of the land portion 34 can affect the electrical performance of the plasma display panel. The microstructures 25 can be molded or otherwise formed to create a thickness profile of the land portion 34. The thickness profile can be designed to provide a thickness that is constant over the width of the land portion 34. In other cases, the thickness profile of the land portion 34 can be designed to provide a thickness that is variable over the width of the land portion 34. A variable thickness profile can be compatible with other aspects of the PDP, for example, the placement and dimensions of the back electrodes 23 or the architecture of the barrier portions 32. During processing, however, changes may occur in the material of the microstructure 25 that have an undesirable effect on the electrical performance of the PDP.

Substantial differences between individual land portions 31, for example, different thicknesses or different thickness profiles of the land portions 34, can result in undesirable light emission patterns (e.g., unequal emissions of the phosphors.) This can be the result of, for example, substantial differences in the switching voltage for individual pixels during operation of the plasma display panel due to substantial differences between individual land portions. These undesirable light emission patterns may be manifested by variations in pixel-to-pixel brightness or a difficulty in lighting up some pixels.

Electrical performance can also be compromised by defects introduced into the microstructure 25 following manufacturing steps (such as curing or thermal processing steps). Microstructures 25 can suffer from defects such as, for example, fracturing, splintering, breakage, unequal shrinkage, splitting, and bulging. Fractures 33 or other defects in the microstructure 25, as illustrated in FIG. 4, can expose portions of the back electrode 23, back substrate 21, or both. These defects can also cause undesirable electrical performance of the plasma display by creating substantial differences in the switching voltage during operation of the plasma display panel. In addition, fractures can trap gas species that, over time, diffuse into adjacent cells during operation. This degrades performance of the plasma display panel during use and ultimately shortens its lifetime.

In addition to requiring fewer steps for formation, microstructures molded with a uniform land portions 34 and barrier portions 32 can have desirable physical properties. The presence of a land portion 34 can provide overall structural stability to the molded microstructures 25. However, fractures introduced in or near the land portion 34 during debinding and sintering can potentially compromise the attachment of the barrier portion 32 to the back substrate 21.

Figure 5:
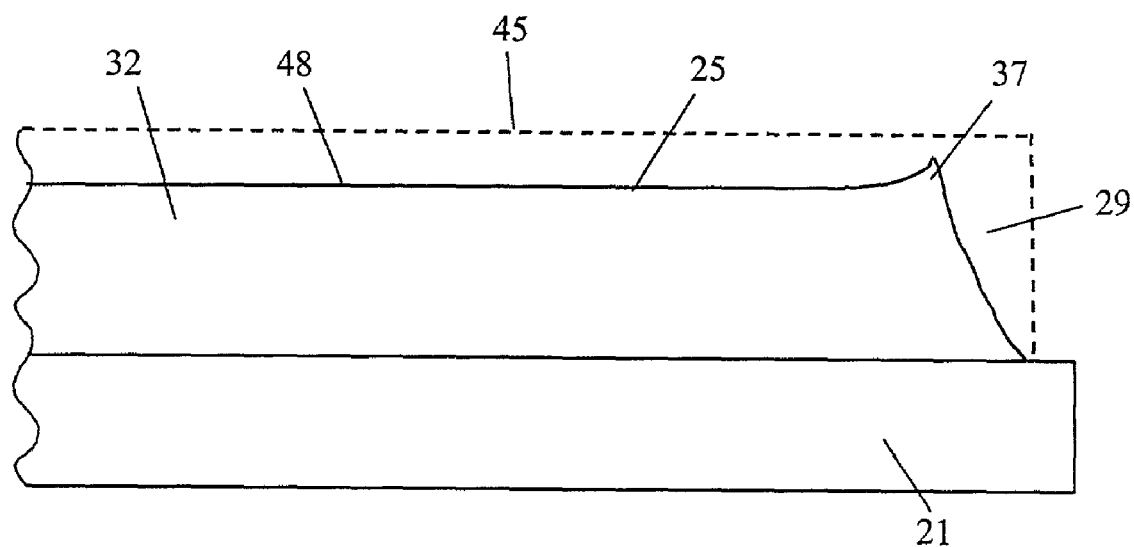
FIG. 5 is a lateral cross-sectional schematic representation of an end of a ceramic microstructure barrier portion showing a pattern of shrinkage from the green state.

Shrinkage occurs during firing as the microstructure 25 densifies. FIG. 4 illustrates a transverse cross-sectional view of microstructures 25 on a back substrate 21 after firing and FIG. 5 illustrates a lateral cross sectional view of an end of a microstructure 25 on a back substrate 21 after firing. Firing densifies microstructures 25 so that their profile shrinks somewhat from their green state profile 45 as indicated. As shown, most portions of the fired microstructures 25 generally maintain their relative shape according to the shape of the green state microstructure 45. FIG. 4 also illustrates that the fired microstructures 25 generally maintain their position and pitch relative to the back substrate 21 and back electrode 23 patterned on the back substrate 21. However, shrinkage of the microstructure 25 during the firing can cause increased stress in the fired material. This stress is released during the firing or cooling process and can result in cracks, or fractures, in the microstructure 25.

Fractures 33 can be attributed, at least partially, to the shape of the green state microstructures 45 prior to thermal processing. Green state microstructures 45 which are molded to form a shape similar to that illustrated in FIG. 4 are particularly likely to suffer from fractures 33 after firing. This is especially true when transverse cross-sectional profile of the green state microstructures 45 contains a surface discontinuity 43 near the land portion 34. As illustrated in FIG. 4 the microstructure 25 contains a channel 16 that has a surface 61, the surface 61 includes a barrier surface 52 and a land surface 54. A surface discontinuity 43 is a point where two parts of the surface 61 meet (as illustrated in FIG. 4 it is the point where the barrier surface 52 meets the land surface 54) and there is a substantial discontinuity in slope, for example, a substantial discontinuity in the slope of the barrier surface 52 relative to the slope of land surface 54.

Figure 6:
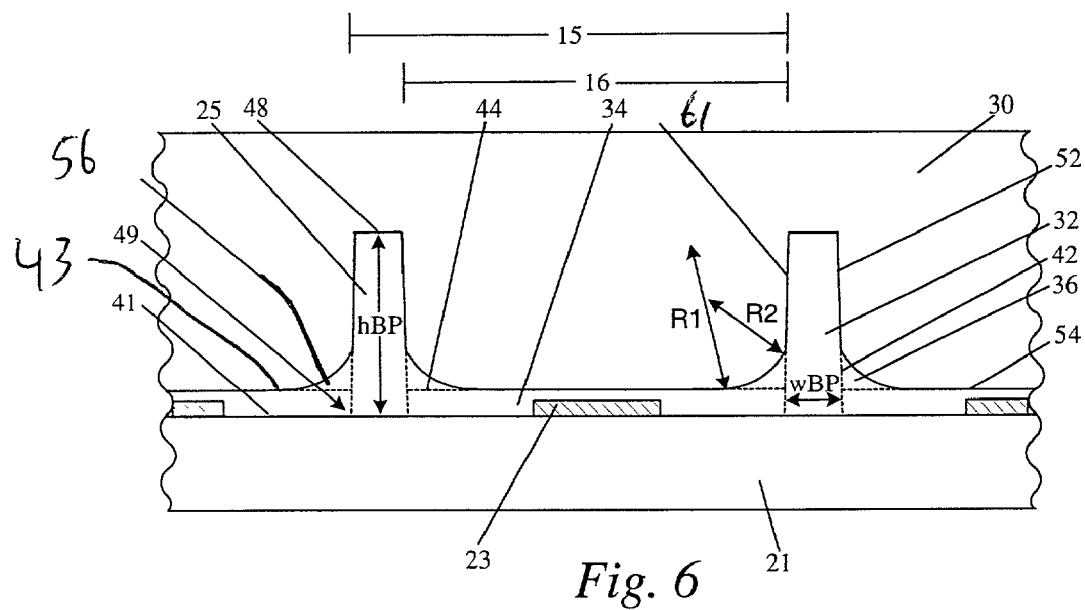
FIG. 6 is a transverse cross-sectional schematic representation of a first embodiment of microstructures with curvature on a substrate.

Another example is shown in FIG. 6, which illustrates microstructures 25 having a curved portion 36. In this example, a surface discontinuity at point 43 may exist on a surface 61 between a curved surface 56 and a land surface 54 when the slope of the land surface 54 is not substantially the same as the slope of the curved surface 56 at that point 43. A surface discontinuity can be visualized as a break in the smoothness of the surface 61. Surface discontinuities also can exist at points, for example, where a curved surface 56 meets a barrier surface 52, however, fractures typically occur at or near a surface discontinuity that is proximal to the land portion 34.

Figure 14:
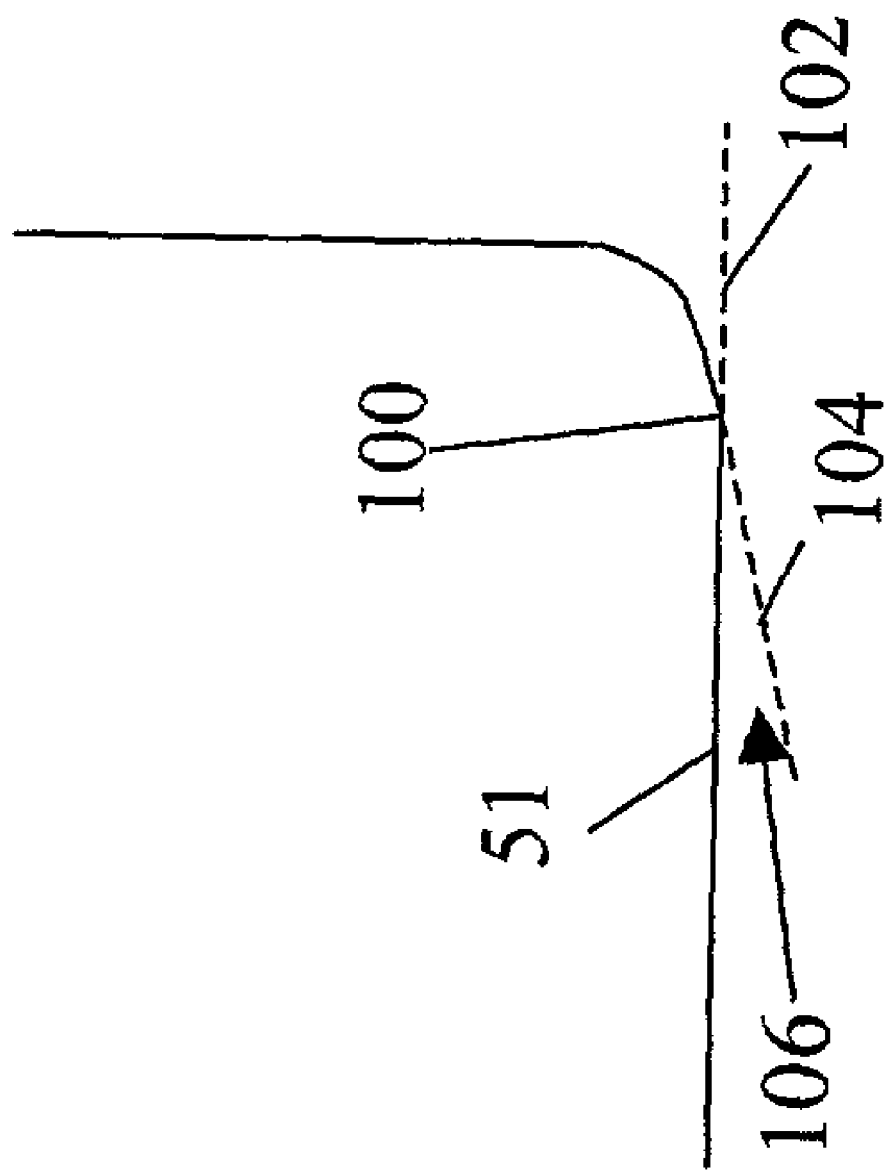
FIG. 14 is a cross-sectional view of a schematic representation of a portion of a surface of a microstructure.

A surface 61 is considered discontinuous at a point 43 if there is a substantial difference between the slope 102 at that point 43 when the point is approached from one direction and the slope 104 at that point 43 when approached from the opposite direction, as illustrated in FIG. 14. In other words, as used herein, a surface 61 is continuous at a point 100 if the instantaneous linear slopes 102, 104 derived by approaching the point from two directions along the surface 61 differ in angle 106 by no more than about 5 degrees, and, preferably, no more than about 3 degrees, when extended linearly, as illustrated in FIG. 14.

As another source of microstructure difficulties, the shrinkage that occurs during firing of the microstructures can affect the ends of the barrier portions. As illustrated in FIG. 5, a lateral cross section shows deformations (for example, deformation 37) that appear at the barrier portion end 29 of the microstructure 25 after thermal processing. Firing densifies microstructures 25 so that their profile shrinks from their green state profile 45 as indicated. In at least some instances, this shrinkage ranges from 30% to 40% after firing.

As shown, the top 48 of the barrier portion over the majority of the length of the barrier portion 32 maintains a relatively flat surface. However, the barrier portion ends 29 generally do not shrink uniformly with the rest of the barrier portion 32 and a slight curling of the barrier portion ends 29 typically occurs, resulting in a deformation 37. This deformation 37 can create multiple problems in the assembly and the functioning of the plasma display panel or other device. First, during sealing and handling of a display, mechanical forces can cause the deformations 37 to break off. End pieces that have broken off can be detrimental to PDP function and life. Second, if deformations 37 stay intact in a display, the deformations 37 will provide an area of lift to the front substrate 51. The front substrate 51 will not be flush with the tops 48 of the barrier portions along the length of the barrier portions 32 and a gap is created between the tops 48 of the barrier portions and the surface of the front substrate 51. This can lead to cross talk between excited gas species in adjacent cells as well as large differences in switching voltage during operation.

Microstructures incorporating novel shapes have been developed. The current invention can be used to, if desired, overcome one or more problems that are associated with the thermal processing of materials, for example, fracturing and deformation of that material. This can be particularly useful for the preparation of microstructures that include a land portion and a barrier portion. In one embodiment, the microstructures are provided having a curved surface of a curved portion that is continuous with a land surface of a land portion. In another embodiment, microstructures are provided that have a thin barrier width profile. In these embodiments the shape or dimensions of the microstructures typically provide increased fracture-resistance. In another embodiment of the invention, the microstructures include barrier portions with shaped ends, in particular, step-shaped ends. In yet another embodiment a method to shape barrier ends of microstructures by weighting the ends of the barrier portions is provided. In addition, techniques allowing for the molding and forming of microstructures are also embodiments of the inventions.

The shape of the microstructures 25 is formed by a patterned mold 30 that is generally fabricated to be a reverse image of the green state microstructures formed on the back substrate 21. The microstructures 25 are generally formed by placing the material between the back substrate 21 and the patterned surface of the mold 30. In one embodiment, as illustrated in FIG. 6, the patterned mold 30 shapes the material into a plurality of repeating microstructure units 15, each repeating microstructure unit 15 having three primary portions: a barrier portion 32, a land portion 34, and a curved portion 36. The repeating microstructure units 15 form a plurality of channels 16 in the material, the channels 16 having a surface 61, a portion of which is curved and defined by the shape of the barrier portion 32, land portion 24, and curved portions 36. The surface 61 of the channel 16 can include a barrier surface 52, a land surface 54, and a curved surface 56, corresponding to the surface of the respective portions.

Microstructures 25 can be shaped, if desired, to reduce the probability that fractures 33 will develop near the region of the microstructure 25 where the barrier portion 32 meets the land portion 34, as illustrated in FIG. 4. In one embodiment, an example of which is illustrated in FIG. 6, a substantially continuous surface 61 from the curved portion 36 to the land portion 24 is provided. As discussed herein, the current invention describes microstructures 25, and techniques for making microstructures 25, that include a curved portion 36 having a curved surface 56 that is continuous with the land surface 54. Examples of parameters that describe the overall shape of the microstructures 25, including the surface 61, are described below.

For a typical plasma display panel (FIG. 1), the patterned mold 30 can form 1000 to 5000 or more repeating microstructure units 15 on the surface of the back substrate 21. The surface of the back substrate 21 is typically patterned with parallel address electrodes 23 and, when the microstructures 25 are formed, the microstructures 25 are aligned with the back electrodes 23. Typically the land portions 34 are aligned with the back electrodes 23.

The barrier portion 32 forms a barrier structure that physically contains the inert gasses of the plasma display panel. Although the material of the barrier portion 32 is physically continuous with material of the land portions 34 and curved portions 36, it is convenient to describe details of the current invention by defining artificial boundaries of the barrier portion 32. Each side of the barrier portion 32 is bounded by a barrier line 42. The barrier line 42 runs from the barrier portion top 48 to a point on the microstructure/substrate interface 41. The barrier line 42 follows the slope of the vertical surface of the barrier portion 32 near the barrier portion top 48. A barrier line angle 49 is formed by the barrier line 42 and the microstructure/substrate interface 41. The barrier line angle 49 is generally in the range of 130° to 90°, typically in the range of 115° to 90°, and can be in the range of 95° to 90°.

One example of a plasma display panel includes barrier portions 32 having heights (hBP) in the range of 80 to 200 μm or in the range of 100 to 170 μm, as measured from the microstructure/substrate interface 41 to the barrier portion top 48. At the barrier portion top 48, the width of the barrier portion 32 is typically, for example, in the range of 20 to 80 μm. At microstructure/substrate interface 41 the width of the barrier portion 32 is typically, for example, in the range of 20 to 120 μm.

In some cases the land portion 34 can form a dielectric layer that encompasses the tops and the sides of the back electrode 23 on the surface of the back substrate 21. For example, when the back electrode 23 is formed on the surface of the back substrate 21 (e.g., above the microstructure/substrate interface 41), the material of the microstructures 25 is in contact with the top and sides of the back electrodes 23. In other cases the back electrode 23 can be formed in the back substrate 21 so the material of the microstructure 25 is only in contact with the top of the back electrode 23 or not in contact with the back electrode 23 at all.

The material of the land portion 34 is contiguous with material of the barrier portion 32 and curved portions 36. Each side of the land portion 34 is bounded by the barrier lines 42 of the adjacent barrier portions 32; the barrier lines 42 therefore, can define the width of the land portion 34. The bottom of the land portion 34 is bounded by the microstructure/substrate interface 41 and the top of the land portion 34 is bounded by the land line 44, which is a horizontal line that runs along the land surface 54. The land line 44 deviates from the land surface 54 when the surface 61 curves away from the land portion 34.

In one example of a plasma display panel the land portions have a thickness in the range of 8 to 25 µm, as measured from the microstructure/substrate interface 41 to the land surface 54. The width of the land portion, for example, is in the range of 100 to 400 µm, measured as the distance between barrier lines 42 of adjacent barrier portions 32. Since a part of the material of the land portion 34 forms a dielectric layer above the back electrode 23, in some instances it is desirable to keep the thickness of this layer constant above at least a portion of the width of the back electrode 23. For example, the thickness is constant over at least 75%, 85%, 95%, or, preferably, over 100% of the electrode.

In one embodiment of the invention, as illustrated in FIG. 6, the surface 61 is substantially continuous from the curved surface 56 to the land surface 54. The surface 61 may optionally include a surface discontinuity between the curved surface 56 and the barrier surface 52. Therefore, the curved surface 56 may not be continuous with the barrier surface 52. It is convenient to describe details of this embodiment by defining the curved surface 56 as originating from the barrier surface 52 and terminating on the land surface 54. In one embodiment, the curved surface 56 preferably originates on the barrier line 42 closer to the microstructure/substrate interface 41 than the barrier portion top 48. The curved surface 56 preferably terminates on the land line 44 closer to the barrier line 42 than to the back electrode 23.

Figure 7:
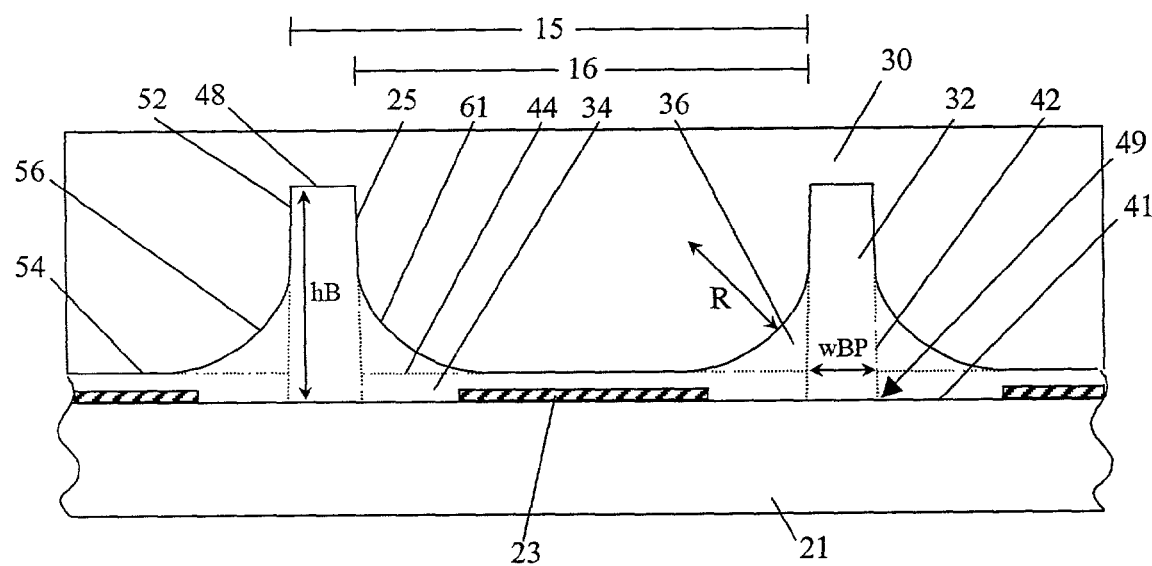
FIG. 7 is a transverse cross-sectional schematic representation of a second embodiment of microstructures with curvature on a substrate.

In another embodiment, as shown in FIG. 7, the surface 61 can be substantially continuous between the barrier surface 52 and the land surface 54. The continuity along the surface 61 does not provide a surface discontinuity within the channel 16. In one embodiment, the curved surface 56 preferably originates on the barrier line 42 closer to the microstructure/substrate interface 41 than the barrier portion top 48. In one embodiment, the curved surface 56 preferably terminates at a point on the land line 44 that is closer to the barrier line 42 than to the back electrode 23.

Figure 8:
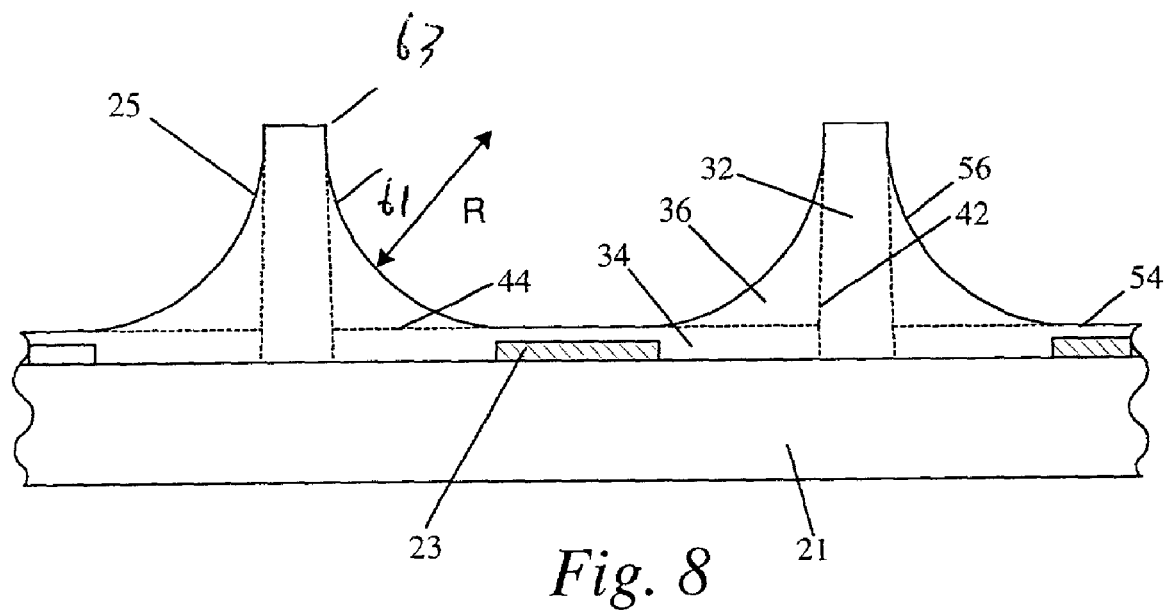
FIG. 8 is a transverse cross-sectional schematic representation of a third embodiment of microstructures with curvature on a substrate.

In another embodiment of the invention, as illustrated in FIG. 8, the curved surface 56 originates at the barrier top corner 63 and terminates horizontally on the land surface 54. Since the curved surface 56 originates at the barrier top corner 63 the side of the barrier portion 32 generally has curvature. In one embodiment, the curved surface 56 preferably terminates at a point on the land line 44 that is closer to the side of the barrier line 42 than to the back electrode 23.

In some instances, it is useful to define the surface 61 or the curved surface 56 by a radius of curvature R. The radius of curvature R and the curvature κ, are inversely proportional to each other and can be represented by the equation:

$$R = 1/\kappa$$

As the radius of curvature R increases, the curvature κ, decreases. The radius of curvature R for a curved surface can be described relative to other dimensions of the microstructure 25, for example, the barrier portion height hBP, the barrier portion width wBP, or the land portion thickness hLP.

In one embodiment of the invention, the curved surface 56 of the microstructure 25 has a single radius of curvature. This indicates that the curvature κ does not change at any point along the curved surface 56. The shape of the curved surface 56 can be identical to the shape of an arc of a circle, wherein the radius of the circle is equal to the radius of curvature R of the curved surface 56. The radius of curvature R can be selected based on other dimensions of the microstructure 25. For example, the radius of curvature R can be a fraction of the barrier portion height hBP. In a useful embodiment of the invention where the microstructure 25 has a curved surface 56 and the curved surface 56 is defined by a single radius of curvature R, the radius of curvature R is in the range of 5% to 80% of the barrier portion height hBP, in the range of 10% to 50% of the barrier portion height hBP, or in the range of 12% to 25% of the barrier portion height hBP.

In another embodiment of the invention, the curved surface 56 is defined by more than one radius of curvature. In one example of this embodiment, as illustrated in FIG. 6, two radii of curvature, R1 and R2 define the curved surface 56 where the land surface 54 meets the curved surface 56 and the curved surface 56 meets the barrier surface 52, respectively. More than two radii of curvature can be used. In some embodiments, a curved surface 56 that includes more than one radius of curvature is substantially continuous (i.e., contains no surface discontinuities). For example, the curved surface includes radii of curvature that are between the values of R1 and R2 for individual points on the curved surface 56. The change in the radii of curvature for points along the curved surface follows the function of the curved surface 56. It is understood that variations in the radius of curvature can be used in combination with the any of the shapes of the curved surfaces 56 of the microstructures 25 as described for any of the embodiments depicted in FIGS. 6, 7, and 8.

Figure 9:
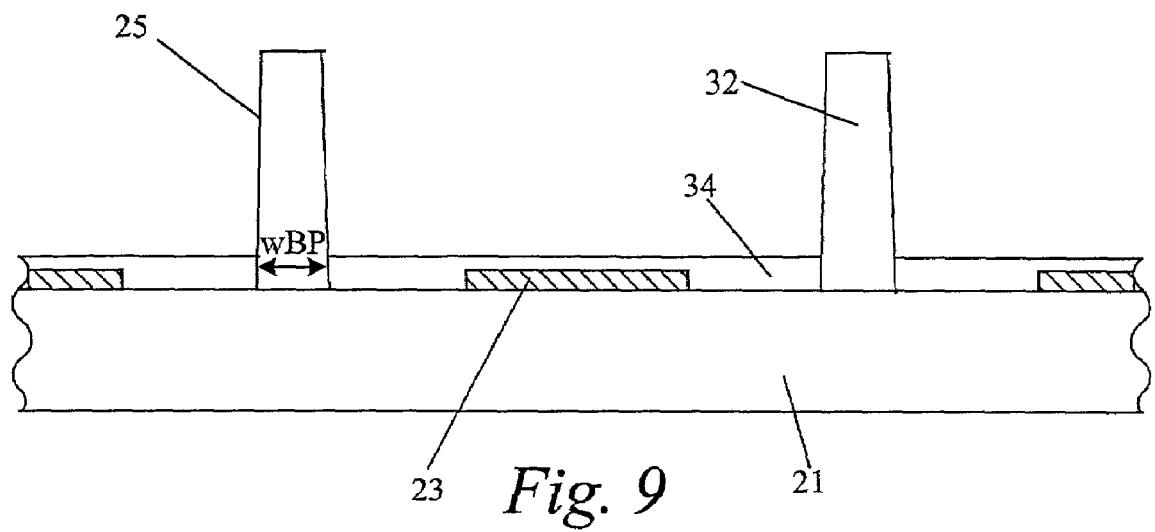
FIG. 9 is a transverse cross-sectional schematic representation of an embodiment of microstructures with reduced barrier portion width.

Another aspect of the invention relates to reducing or preventing fractures by modifying the dimensions of the microstructures 25. It has been discovered that reducing the width of the barrier portion also reduces or prevents stress-associated fractures that occur upon debinding and sintering the microstructure material. Therefore, in another embodiment, as illustrated in FIG. 9, the invention includes microstructures 25 with barrier portions 32 having a reduced barrier portion width wBP. In this embodiment the barrier portion width wBP, as measured at the microstructure/substrate interface 41, is preferably in the range of 25–75 µm, more preferably in the range of 50–75 µm, and most preferably in the range of 65–75 µm. The barrier portion heights hBP are typically in the range of 100–170 µm.

In general, the methods and structures described herein can be used to form articles and devices having microstructures with reduced fracturing. For example, articles and devices can be formed with microstructures on a substrate where at least 99% of the microstructures, and preferably 100% of the microstructures, do not have cracks that have a depth equal to 25% or more of the land thickness as measured between the microstructure/substrate interface 41 and the land line 44.

Following debinding and sintering, it is typically desirable that the tops 48 of the barrier portions are flat and substantially free of physical irregularities. This flatness promotes contact of the facing glass substrate 51 with the tops 48 of the barrier portions along their entire length. This complete contact also "seals" the channels 15 formed by the barrier portions 32 and prevents or substantially hinders gas species in adjacent channels 15 from escaping via gaps between the tops of the barrier portions and the facing glass substrate 51.

During debinding and sintering, the ends of the barrier portions 32 of the microstructures 25 experience shrinkage and suffer from unequal stress release. As illustrated in FIG. 5, a lateral cross section shows deformations in the end of the barrier portion 32 of the microstructure 25 after debinding and sintering. Firing densifies microstructures 25 so that their profile shrinks from their green state profile 45 as indicated. As shown, the tops 48 of the barrier portions, between the barrier portions ends 29, and over the majority of the length of the barrier portions 32, maintain a flat surface according to the shape of the green state microstructure 45. However, the barrier portions ends 29 do not shrink uniformly with the rest of the barrier portion 32 and a slight curling of the barrier portion end 29 occurs, resulting in a deformation 37. The presence of the deformation 37 can create an area of lift on the tops 48 of the barrier portions near the barrier portion ends 29. A deformation 37 can create multiple problems in the assembly and the functioning of the plasma display panel. First, during sealing and handling of a display, mechanical forces can cause the deformations 37 to break off. Barrier end pieces that have cracked off can be detrimental to PDP function and life. Second, as previously indicated, deformations 37 can prevent complete contact of the facing glass substrate 51 with the tops 48 of the barrier portions. In the absence of complete contact gaps can exist between the tops 48 of the barrier portions and the surface of the front substrate 51. This can lead to cross talk between excited gas species in adjacent cells as well as differences in switching voltage during operation.

Figure 10:
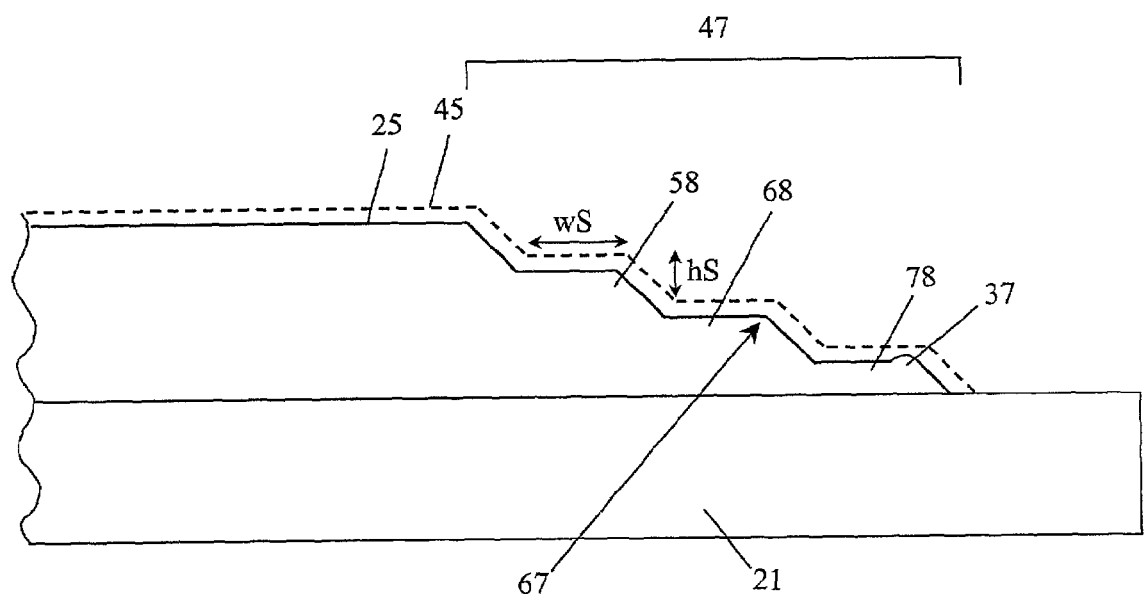
FIG. 10 is a lateral cross-sectional schematic representation of a first embodiment of microstructure barrier portion with a stepped end.

Therefore, it is desirable to shape the barrier ends of the green state microstructures 45 in such a way to prevent deformations from interfering with proper assembly or function of the PDP. As illustrated in FIG. 10, one embodiment of the invention provides green state microstructures 45 molded to have step-shaped ends 47 that, in particular, overcome the problems associated with deformations 37 which occur upon debinding and sintering the microstructures.

As illustrated in FIG. 10, the step-shaped ends 47 of the barrier portion have a first step 58, a second step 68, and a third step 78. Preferably, the step-shaped ends 47 have at least two steps. Each step of the step-shaped end 47 has a step height hS, a step width wS, and a step angle 67. Each step of the step-shaped ends 47 can, respectively, have a different step height hS, a different step width wS, and a different step angle 67. Preferably, the step height hS of each step is at least 20 μm and, preferably, the step width wS is equal to or greater than the step height hS. The step angle is generally in the range of 90 to 175°, typically in the range of 90 to 145°, and can be in the range of 90 to 125° or 90 to 110°. The shape of the microstructure 25 after firing can mimic the shape of the green state microstructure 45 over the entire lateral cross-sectional profile of the barrier portion 32, including the stepped-shaped end 47. At a location on the stepped-shaped end 47, usually on a step that is adjacent to the back substrate 21, for example on the third step 78, the stepped-shaped end 47 can display a deformation 37 which appears after debinding and sintering. However, in a step-shaped end 47 this deformation 37 is not likely to be detrimental in the assembly or the functioning of the PDP.

Figure 11:
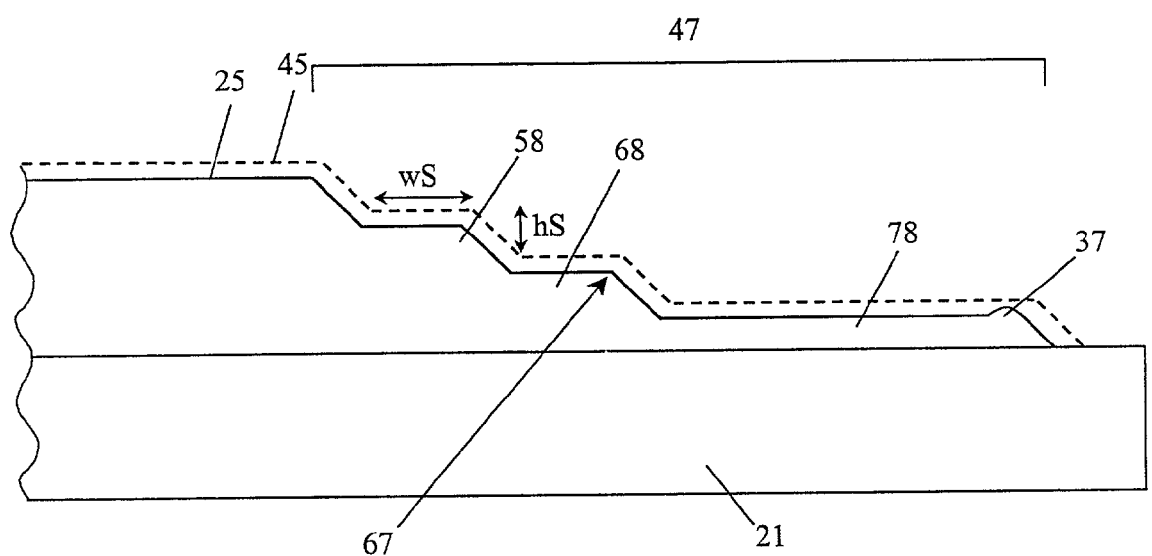
FIG. 11 is a lateral cross-sectional schematic representation of a second embodiment of microstructure barrier portion with a stepped end.

In another variation of this embodiment, as illustrated in FIG. 11, the step that is adjacent to the back substrate 21, for example the third step 78, is elongated. Preferably the ratio of the step height hS to the step width wS (hS:wS) for the step adjacent to the back substrate 21, for example the third step 78, is in the range of 1:1 to 1:10, more preferably in the range of 1:1.5 to 1:8, and most preferably in the range of 1:2 to 1:6.

Figure 12:
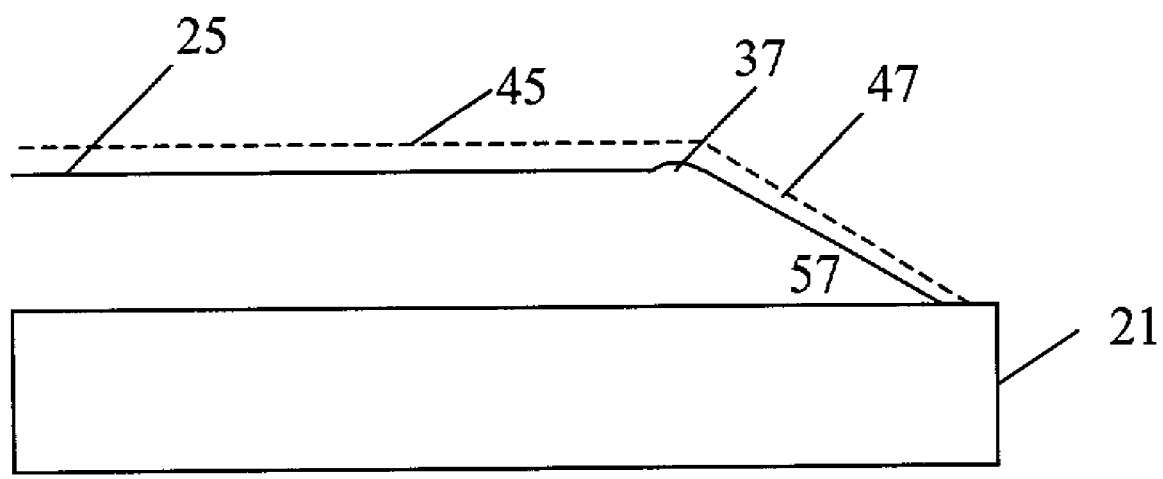
FIG. 12 is a lateral cross-sectional schematic representation of a microstructure barrier portion with a tapered end.

In another embodiment of the invention, as illustrated in FIG. 12, the ends 47 of the barrier portions 32 taper from the barrier portion top 48 to the back substrate 21 surface. The tapered ends 47 of the barrier portions 32 can be of various shapes or geometries and provide a green structure shape 47, that, when thermally processed, are structurally sound and do not form substantial deformations which rise above the barrier portion top 48. Preferably, the tapered end angle 57 of the green state tapered end 47 is no more than 60° and no less than 15°.

As illustrated in FIG. 12, a suitable shape of a tapered end 47 of a barrier portion 32 in the green structure states includes a straight line that runs from the top of the green state microstructure 45 to the surface of the back substrate 21. Following thermal processing, the microstructure shrinks from its green state shape 45 to the processed state 25. However, due to the tapered end 47, any change in shape at the end of the barrier portion 32 that occurs during thermal processing does not substantially affect the flatness of the barrier portion top 48 or the integrity of the end of the barrier portion.

Figure 13:
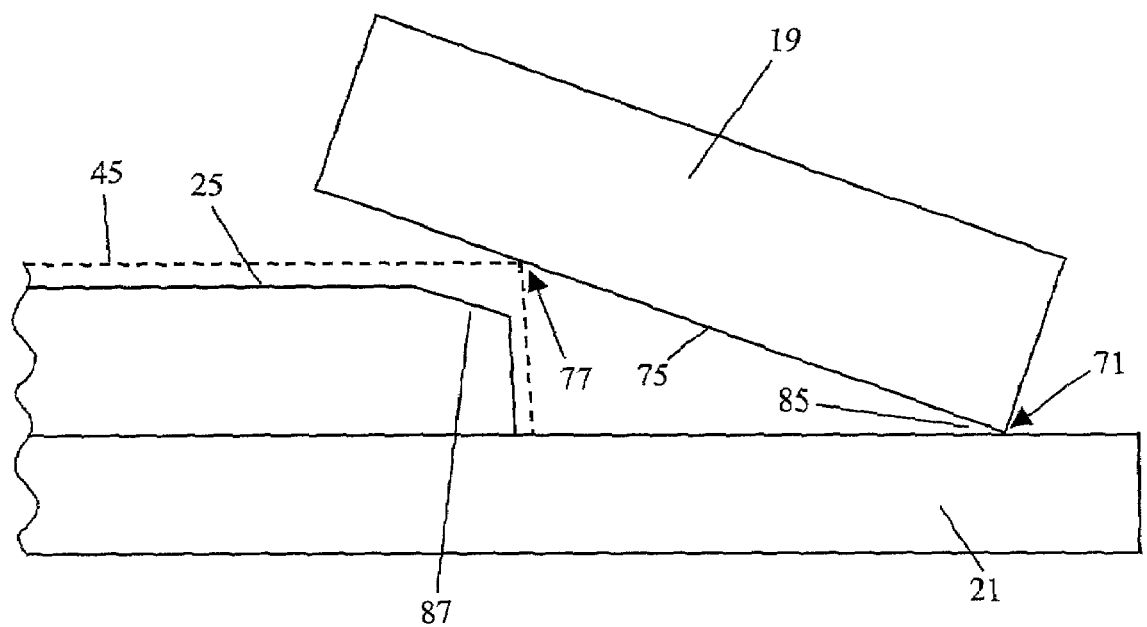
FIG. 13 is a lateral cross-sectional schematic representation of a microstructure barrier portion with a weight.

Another embodiment is a process to prevent or reduce the likelihood or amount that the ends of the barrier portions 32 curl during debinding and sintering the microstructures 25. As shown in FIG. 13 a weight 19 is placed in contact with the top corner 77 of the barrier portion. Typically a weight will contact at least one top corner 77 of the barrier portion. Multiple weights can be present along each edge of the assembly that present barrier ends. In a preferred embodiment, a weight is placed along each assembly edge that presents barrier ends, and the weight contacts most or all of the top corners of the barrier portions.

Preferably, the pressure exerted by the weight on the top corner 77 of the barrier portion is sufficient to prevent the emergence of a deformation 37 (for example, as seen in FIG. 5) during debinding and sintering. The pressure exerted by the weight during debinding and sintering can create an angled barrier end corner 87. The pressure should not too great as to flatten the end of the barrier portion 32 to the surface of the back substrate 21. Typically a sufficient pressure is preferably in the range of 0.0001 to 0.002 N (Newtons) per barrier end, more preferably in the range of 0.0001 to 0.001 N per barrier end, and most preferably in the range of 0.0002 to 0.0005 N per barrier end. The weight 19 can be of various shapes, for example a rectangular shape, a triangular shape, a trapezoidal shape, or a rhomboidal shape. Preferably, the bottom 75 of the weight 19 is flat, however a bottom 75 that is somewhat curved or angled can also be used provided that the weight bottom 75 of the weight 19 distinctly contacts the top corner 77 of the barrier portion.

In one embodiment, as illustrated in FIG. 13, contact is made between the top corner 77 of the barrier portion and a point on the weight bottom 75, and contact is also made between the outside bottom corner 71 and the back substrate 21 at a point on the surface of the back substrate 21. However, the outside bottom corner 71 can alternatively be in contact with another surface, for example a surface of an object not associated with the assembly. Contact of the outside bottom corner 71 and the back substrate 21 at a point on the surface of the back substrate 21 can create a weight/substrate angle 85. The weight/substrate angle 85 is generally between 0.5 to 2.5°, typically between 0.5 to 1°, and can be between 0.5 to 0.8°.

The weight 19 is typically composed of materials that can withstand temperatures reached during debinding and sintering of the ceramic material, for example, glass or metal. Preferably these materials do not bond to the or chemically react with the ceramic material during debinding and sintering. Examples of suitable materials include aluminum oxide, soda-lime glass, and zirconia. One preferred material is zirconia. Unprimed soda-lime glass does stick to rib formulation slightly during sintering. Alumina and zirconia did not. Zirconia is least reactive.

It will be recognized that other articles can also be formed using a substrate with the molded microstructures. For example, the molded microstructures can be used to form capillary channels for applications such as electrophoresis plates. In addition, the molded microstructures could be used for plasma or other applications that produce light.

EXAMPLES

Examples 1–10

Barrier ribs were formed on a substrate using a mold and a photocurable glass frit slurry. A glass frit slurry was prepared. The glass frit slurry formulation used in these examples included 80 parts by weight RFW030 glass powder (Asahi Glass Co., Tokyo, Japan) which contains lead borosilicate glass frit with refractory fillers such as $TiO_2$ and $Al_2O_3$. To the glass powder was added 8.034 parts by weight BisGMA (bisphenol-a diglycidyl ether dimethacrylate), available form Sartomer Company, Inc., Exton, Pa., and 4.326 parts by weight TEGDMA (triethylene glycol dimethacrylate), available from Kyoeisha Chemical Co., Ltd., Japan, to form the curable fugitive binder. As a diluent, 7 parts by weight of 1,3 butanediol (Aldrich Chemical Co., Milwaukee, Wis.) was used. In addition, 0.12 parts by weight POCAII (phosphate polyoxyalkyl polyol), available from 3M Company, St. Paul, Minn. (other phosphate polyoxyalkyl polyols can be used and are available from other manufacturers) was added as a dispersant, 0.16 parts by weight A174 Silane (Aldrich Chemical Co., Milwaukee, Wis.) was added as a silane coupling agent, and 0.16 parts by weight Irgacur™ 819 (Ciba Specialty Chemicals, Basel, Switzerland) was added as the cure initiator. In additional, 0.20 parts by weight BYK A555 from BYK Chemie USA, Wallingford, Conn. was added as a de-airing agent.

All liquid ingredients and the photo-initiator were combined in a stainless steel mixing container. The ingredients were blended using a cowles blade (VWR Scientific Products, West Chester, Pa.) driven by a pneumatic motor. With the mixing blade running, the solid ingredients were slowly added. After all the ingredients were incorporated, the mixture was blended for an additional 5 minutes. The slurry was transferred to a high-density polyethylene container charged with ½ inch cylindrical high density aluminum oxide milling *media*. *M*illing was performed using a paint conditioner (R*ed* D*evil* M*odel* 5100, Union, N.J.) for 30 minutes. The slurry was then drained from the ball mill. Finally, the slurry was milled using a 3-roll mill (Model 2.5×5 TRM, Charles Ross & Son Company, Haupauge, N.Y.) at 60° C.

A knife coater was used to coat the slurry on 2.3 mm thick soda-lime glass substrates (Libbey Owen Ford Glass Co., Charleston, W. Va.). The knife gap was set at 75 micrometers for all of the samples.

After coating, a mold having barrier rib features was laminated onto the coated substrate. Lamination pressure was nominally 0.68 kg/cm and lamination speed was nominally 3 cm/sec. The molds used were polycarbonate or photo-curable acrylate material which was cast and cured onto a high stiffness backing material such as 125 μm thick PET (E. I. Du Pont De Nemours and Company, Wilmington, Del.). The mold was produced by casting and curing of an acrylate resin against a metal tool. Molds having different types of barrier rib microstructures were evaluated.

After molding, the coated substrate was exposed to a blue light source to harden the glass frit slurry. Curing was performed using a blue light source at 1.5 inch (about 3.8 cm) sample surface. The light source is constructed from 10 super-actinic fluorescent lamps (Model TLDK 30W/03, Philips Electronics N.V., Einhoven, Netherlands) spaced at 2 inches (about 5.1 cm) apart. These superactinic lamps provide light in a wavelength range of about 400 to 500 nm. Curing time was typically 30 seconds.

The mold was removed and the samples were sintered in air according to the following thermal cycle: 3° C./min to 300° C., 5° C./min to 560° C., soak for 20 minutes, and cooled at 2–3° C./min to ambient.

During sintering, the barrier ribs were constrained to the rigid glass substrate. Due to this constraint, in-plane stresses were developed as barrier ribs densified and shrunk during sintering. Furthermore, because of the large difference between the feature thickness between a barrier rib and adjacent continuous land regions, a large differential stress could develop during sintering. Hence, a sharp corner at the base of barrier ribs showed a high tendency to cracking during sintering. The result was no different by putting chamfer in this area. To alleviate this cracking, the transition from barrier rib to land was done in a relatively smooth manner. Mathematically, if one were to represent the transition from barrier rib side-wall to land as a continuous line, then the derivative of this function was preferably continuous to avoid developing large stress concentration. In Examples 4–8 and 10, barrier ribs having various rib base radii of curvature were tested. All produced cracked free parts. In the cases of Examples 3 and 9, the radius blends were not completely tangent to the land layer and cracks were observed.

Rib cracks were evaluated using light microscopy (through transmitted light) (Leitz DMRBE, Leica Mikroskopie & System GmbH, Wetzlar, Germany) and scanning electron microscope (AMPAX model 1920, Bedford, Mass.). All cracks were observed at the rib base. The following Table provides information on the products produced in each Example. All dimensions are for the green state prior to sintering. The draft angle refers to the angle of the barrier line relative to vertical.

| Example | Rib Pitch (μm) | Rib Height (μm) | Top width (μm) | Draft angle | Rib base radius of curvature | Quality of blend | Cracks? |
|---|---|---|---|---|---|---|---|
| 1 | 360 | 202 | 68 | 8° | <0.1 μm | N/a | Yes |
| 2 | 220 | 185 | 75 | 8° | chamfer | N/a | Yes |
| 3 | 360 | 213 | 37 | 8° | 50 | Poor | Yes |
| 4 | 360 | 213 | 37 | 8° | 50 | Good | No |
| 5 | 286 | 202 | 37 | 8° | 25 | Good | No |

-continued

| Example | Rib Pitch (μm) | Rib Height (μm) | Top width (μm) | Draft angle | Rib base radius of curvature | Quality of blend | Cracks? |
|---|---|---|---|---|---|---|---|
| 6 | 286 | 202 | 37 | 8° | 50 | Good | No |
| 7 | 360 | 202 | 37 | 8° | 63 | Good | No |
| 8 | 360 | 202 | 37 | 8° | 75 | Good | No |
| 9 | 277 | 177 | 42 | 8° | 50 | Poor | Yes |
| 10 | 277 | 177 | 37 | 8° | 25 | Good | No |

Examples 11–14

Examples 11–14 were made in the same manner as Examples 1–10 except the coating gap was adjusted using metal feeler gauges. Barrier rib dimensions for these molds were 360 μm pitch, 213 μm high, 37 μm rib top width, 8° draft angle, and 50 μm smooth radius blend.

| Example | Coating thickness (μm) | Lamination speed (cm/sec) | Lamination pressure (kg/cm) | Fired land thickness (μm) |
|---|---|---|---|---|
| 11 | 64 | 2 | 0.68 | 8 |
| 12 | 76 | 2 | 0.68 | 16 |
| 13 | 89 | 2 | 0.68 | 19 |
| 14 | 102 | 2 | 0.68 | 28 |

This indicates that the land thickness can be controlled by choice of the coating thickness.

Example 15

Microstructured barrier ribs were formed on a substrate as described for Examples 1 to 10. During the debinding and sintering process, the barrier rib weighted to prevent deformations. Three different strips of material as weights: 1) 98% aluminum, 2) yttrium stabilized zirconia, and 3) glass. The alumina pieces were 102 cm×25.4 cm×0.060 cm, 6.0 grams, covering approximately 282 ribs at 360 um pitch. The glass pieces were 14.2×2×0.28 cm, 19.8 g covering approximately 394 ribs at 360 μm pitch. The zirconia pieces were 5.8×2×0.5 cm, 34.8 g, covering approximately 161 ribs. Different loads were imposed on the rib edges, as listed in the following Table. Rib heights were 202 um and 360 um pitch for all the samples. Rib number=length/pitch. Based on angle, weight, and width of weights, one can calculate rib load in Newton/rib.

| Material | Weight dimensions in cm | | | Weight, gm | Angle, degree | Rib load, N/rib |
|---|---|---|---|---|---|---|
| | Length | Width | Thickness | | | |
| Alumina | 102 | 25.4 | 0.06 | 6 | 0.6 | 0.0001 |
| SL Glass | 14.2 | 2.0 | 0.28 | 19.8 | 0.7 | 0.00025 |
| Zirconia | 5.8 | 2.0 | 0.5 | 34.8 | 0.7 | 0.0011 |

In all cases, following debinding and sintering, the rib ends did not substantially lift during sintering. When the zirconia weights were used during the process, the rib ends were 10–20 micrometers shorter. After debinding and sintering the zirconia weight demonstrated the smallest amount of adhesion to the glass frit and the soda-lime glass demonstrated the greatest amount of adhesion. There was no residual glass frit observed on the zirconia weights after sintering. Small fragments of glass frit were bonded to the soda-lime glass strips after sintering.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

The invention claimed is:

1. An assembly comprising:
a substrate comprising a plurality of electrodes; and
a plurality of microstructures disposed on the substrate, the plurality of microstructures comprising alternating land portions bounded by adjacent barrier portions comprised of a ceramic material wherein each barrier portion and adjacent land portion are joined by a curved portion having a curved surface that terminates on a land line closer to a side of an electrode adjacent the barrier portion than to a barrier slope line, the curved surface comprises a first radius of curvature proximal to the land surface and a second radius of curvature proximal to the barrier surface, the second radius of curvature is smaller than said first radius of curvature, and the ceramic material of the land portions is continuous with the material of the barrier portions.

2. The assembly of claim 1, wherein the substrate is a glass substrate.

3. The assembly of claim 2, wherein the microstructures are aligned with the plurality of electrodes on the substrate.

4. The assembly of claim 1, wherein a smallest radius of curvature is at least 5% of the height of the barrier portion and the largest radius of curvature is not more than 200% of the height of the barrier portion.

5. The assembly of claim 1, wherein the curved surface originates on a barrier slope line closer to the substrate than to a top of the barrier portion.

6. The assembly of claim 1, wherein a cross-sectional area of the curved portion is in the range of 5–80% of the area of the barrier portion.

7. An assembly comprising:
a substrate comprising a plurality of electrodes; and
a plurality of microstructures disposed on the substrate, the plurality of microstructures comprising alternating land portions bounded by adjacent barrier portions comprised of a ceramic material wherein each barrier portion and adjacent land portion are joined by a curved portion having a curved surface that terminates on a land line closer to a side of an electrode adjacent the barrier portion than to a barrier slope line, the ceramic material of the land portions is continuous with the material of the barrier portions, and the barrier portion comprise step-shaped ends, wherein each step comprises:
a vertical step surface having a height of at least 20 μm,
a horizontal step surface having a width greater than said height of vertical step surface,
wherein said vertical step surface and said horizontal step surface form a step angle, said step angle being at least 90°.

8. The assembly of claim 1, wherein the curved surface and the barrier surface are substantially continuous.

9. The assembly of claim 1 wherein each of the barrier portions has a width at its top of not more than 75 μm.

* * * * *

UNITED STATES PATENT AND TRADEMARK OFFICE
CERTIFICATE OF CORRECTION

PATENT NO. : 7,176,492 B2 Page 1 of 2
APPLICATION NO. : 09/974223
DATED : February 13, 2007
INVENTOR(S) : Raymond C. Chiu It is certified that error appears in the above-identified patent and that said Letters Patent is hereby corrected as shown below:

On the title page item (56),

Page 2
Column 2, Foreign Patent Documents line 32, Below "01/20636" delete "01/20636". (Repeated Entry)

Column 2
Line 66, Delete "comer" and insert -- corner --, therefor.

Column 11
Line 55, Delete "comer" and insert -- corner --, therefor.

Column 14
Line 34, Delete "comer" and insert -- corner --, therefor.
Line 35, Delete "comer" and insert -- corner --, therefor.
Line 40, Delete "comers" and insert -- corners --, therefor.
Line 42, Delete "comer" and insert -- corner --, therefor.
Line 46, Delete "comer" and insert -- corner --, therefor.
Line 58, Delete "comer" and insert -- corner --, therefor.
Line 61, Delete "comer" and insert -- corner --, therefor.
Line 63, Delete "comer" and insert -- corner --, therefor.
Line 65, Delete "comer" and insert -- corner --, therefor.

Column 15
Line 1, Delete "comer" and insert -- corner --, therefor.
Line 66, Delete "Haupauge," and insert -- Hauppauge, --, therefor.

Column 17
Line 38, Before "weighted" insert -- ends were --.
Line 39, Before "as" insert -- were used --.
Line 40, Before "glass" insert -- soda-lime --.
Line 42, Delete "360 um" and insert -- 360 $\mu$m --, therefor.
Line 47, Delete "202 um" and insert -- 202 $\mu$m --, therefor.

UNITED STATES PATENT AND TRADEMARK OFFICE
CERTIFICATE OF CORRECTION

PATENT NO. : 7,176,492 B2
APPLICATION NO. : 09/974223
DATED : February 13, 2007
INVENTOR(S) : Raymond C. Chiu It is certified that error appears in the above-identified patent and that said Letters Patent is hereby corrected as shown below:

<u>Column 17</u>
Line 47, Delete "360 um" and insert -- 360 μm --, therefor.

Signed and Sealed this

Tenth Day of April, 2007

JON W. DUDAS
*Director of the United States Patent and Trademark Office*